(12) United States Patent
Su et al.

(10) Patent No.: US 6,391,515 B1
(45) Date of Patent: May 21, 2002

(54) MANUFACTURING PROCESS FOR PREPARING SOL-GEL OPTICAL WAVEGUIDES

(75) Inventors: Jung-Chieh Su, Hsin-Chu; Chien-Kang Kao, Hsin-Tien; I-Nan Lin, Hsin-Chu; Chuen-Horng Tsai, Hsin-Chu; Cheng-Chung Chi, Hsin-Chu; Yung-Sheng Liu, Hsin-Chu, all of (TW)

(73) Assignees: Industrial Technology Research Institute; National Tsing Hua University, both of Hsinchu (TW)

( * ) Notice: Subject to any disclaimer, the term of this patent is extended or adjusted under 35 U.S.C. 154(b) by 0 days.

(21) Appl. No.: 09/572,506

(22) Filed: May 15, 2000

(51) Int. Cl.[7] .............................. G03F 7/16; G03F 7/38; G03F 7/40; G02B 6/10; G02B 6/00
(52) U.S. Cl. ................ 430/198; 430/321; 430/327; 430/328; 430/329; 430/330; 385/129; 385/131; 385/141; 385/143; 385/145
(58) Field of Search ................. 430/198, 321, 430/328, 329, 330, 327; 385/129, 131, 143, 145, 141

(56) References Cited

U.S. PATENT DOCUMENTS

| | | | | |
|---|---|---|---|---|
| 4,336,320 A | * | 6/1982 | Cummings et al. | 430/198 |
| 4,375,312 A | * | 3/1983 | Tangonan | 430/321 |
| 5,130,397 A | * | 7/1992 | Zeigler | 528/9 |
| 6,256,441 B1 | * | 7/2001 | Ogawa | 430/321 |

* cited by examiner

Primary Examiner—Richard L. Schilling
(74) Attorney, Agent, or Firm—W. Wayne Liauh

(57) ABSTRACT

This invention discloses a manufacturing process for preparing sol-gel optical waveguides comprising the steps of solution preparation, an optical waveguide photoresist module process, and optical waveguide molding and sintering. The solution is prepared by mixing water and alcohol to form an alcoholic solution with a properly adjusted pH value followed by mingling with tetraethylorthosilicate (TEOS) at room temperature. The optical waveguide photoresist module process comprises the steps of soft baking, exposure, development, washing by deionized water, drying by a nitrogen gun, and hard baking. The optical waveguide molding and sintering comprises the steps of spinning, sintering, and photoresist module removal.

6 Claims, 5 Drawing Sheets

MANUFACTURING PROCESS FOR PREPARING SOL-GEL OPTICAL WAVEGUIDES

BACKGROUND OF THE INVENTION

1. Field of Invention

The present invention relates to an optical waveguide manufacturing process and, in particular, to a manufacturing process for preparing sol-gel optical waveguides.

2. Related Art

Among various opto-electronic devices using plane optical waveguide technology, silica has been used in semiconductor processes due to its superior resistance to environments and optical properties for many decades. Conventionally the manufacturing of silica plane waveguide materials is achieved mainly by using flame hydrolysis deposition (FHD), ion exchange, chemical vapor deposition (CVD), and sol-gel.

FHD and CVD involve expensive semiconductor equipment and have a higher cost. The advantage of using sol-gel is in that it can be prepared by employing only the spinning or dipping method. Therefore, its cost is much cheaper than other plane optical waveguide processes.

With regard to single/multiple mode plane optical waveguide manufacturing, many researches and papers had been published by, for instance, Ecole Polytechnique in Canada, QPS, Universite de Montpellier II in France, Physical Optical Cooperation in the U.S. recently. In particular, preparing plane optical waveguides using photosensitive sol-gel has a lower cost than adopting conventional high temperature processes. It has such advantages as UV imprinting/curing, an adjustable refractivity, etc, which are particularly preferable for preparing optical waveguides.

Since the single mode plane optical waveguide requires a core layer with a thickness of 6 to 8 $\mu$m and the multiple mode plane optical waveguide requires a core layer with a thickness larger than 50 $\mu$m, the silicon substrate employed must have a buffer layer with a thickness greater than 10 $\mu$m. Using the FHD and CVD methods demands expensive semiconductor equipment with special specifications and would increase the cost. Therefore, adopting the sol-gel manufacturing processes is a practical and cost-effective choice.

However, according to the technical contents disclosed in the U.S. Pat. No. 5,130,397, entitled "Hybrid Sol-Gel Optical Materials", only thin films with a thickness smaller than 10 $\mu$m can be prepared at a time. It is noted that currently researches have been focused on single mode optical waveguides prepared by using photosensitive sol-gel. But little knowledge is known in producing multiple mode plane optical waveguides with a core layer of thickness greater than 50 $\mu$m and silicon substrates with a buffer layer of thickness greater than 10 $\mu$m.

SUMMARY OF THE INVENTION

It is thus a primary object of the present invention to provide a manufacturing process for preparing sol-gel optical waveguides that simultaneously solves the problems existing in the prior that only thin films with a thickness smaller than 10 $\mu$m can be made at a time and cracking phenomena associated therewith, that no multiple mode plane optical waveguide can be manufactured to have a core layer with a thickness greater than 50 $\mu$m, and that no silicon substrate can be prepared to have a buffer layer with a thickness greater than 10 $\mu$m.

The sol-gel optical waveguide manufacturing process of the present invention comprises the steps of: preparing sol-gel ingredients, manufacturing optical waveguide photoresist modules, spinning sol-gel, baking optical waveguide modules, and forming a sol-gel plane optical waveguide.

BRIEF DESCRIPTION OF THE DRAWINGS

The present invention will be described with reference to the accompanying drawings of which.

DETAILED DESCRIPTION OF THE INVENTION

Figure 1:
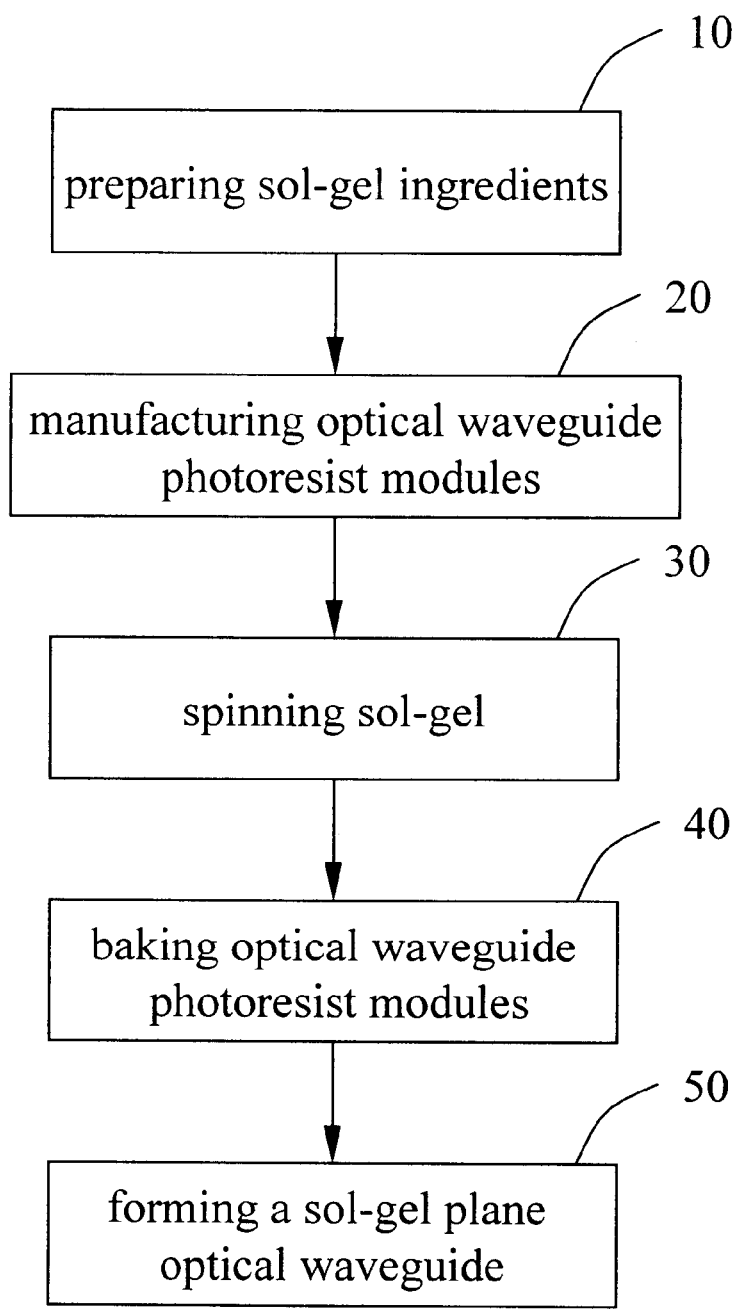
FIG. 1 is a flow chart illustrating the manufacturing of the sol-gel optical waveguide of the invention.

The manufacturing process for preparing sol-gel optical waveguides proposed by the present invention comprises the solution preparation, optical waveguide photoresist module process, and optical waveguide molding and sintering. With reference to FIG. 1, which is a flow chart illustrating the manufacturing of the sol-gel optical waveguide of the invention, sol-gel ingredients are prepared in step 10, an optical waveguide photoresist module is manufactured in step 20, the sol-gel is processed by spinning in step 30, the optical waveguide photoresist module is backed in step 40, and the sol-gel plane optical waveguide is finally formed in step 50.

For a clear explanation of the whole sol-gel optical waveguide manufacturing process, a preferred embodiment is as follows: In the step of solution preparation, 1 to 10 mols of water are 5 to 50 mols of alcohol are put into a beaker to form an alcoholic solution. This alcoholic solution is adjusted to have a pH value smaller than 5.1 to 5 mols of tetraethylorthosilicate (TEOS) are prepared in a flask. Some of the alcoholic solution is then slowly added to TEOS using a burette. After churning for about an hour at room temperature, the rest solution is added into the flask. The resulting solution is further churned for another hour or so until alcohol is diluted to obtain a certain viscosity. The prepared solution is then stored for at least 18 hours before use (waiting for 24 hours is recommended).

Please refer to FIGS. 2A through 2I for schematic illustration of steps of manufacturing the sol-gel optical waveguide of the invention.

Figure 2A:
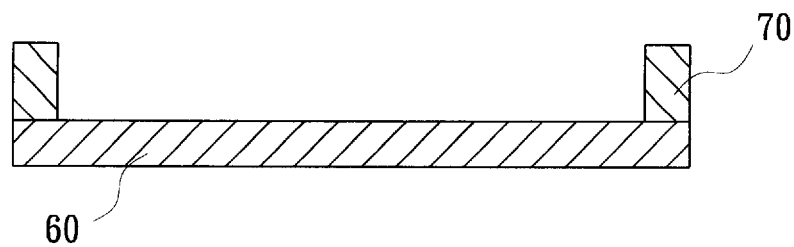
FIGS. 2A through 2I schematically illustrate steps of manufacturing the sol-gel optical waveguide of the invention.

In the step of the optical waveguide photoresist module process, a silicon wafer 60 is coated with a first photoresist layer (10 to 100 $\mu$m) 70 using a spin support (not shown). As shown in FIG. 2A, after soft baking the wafer receives contact exposure of UV light using a mask with an optical waveguide pattern and is immersed in a developer. Washed by deionized water and dried by a nitrogen gun, the wafer is hard baked to obtain a thick photoresist module with the optical waveguide pattern.

Figure 2B:
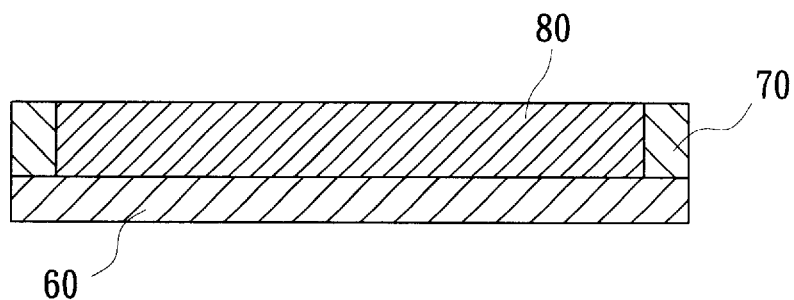
Figure 2C:
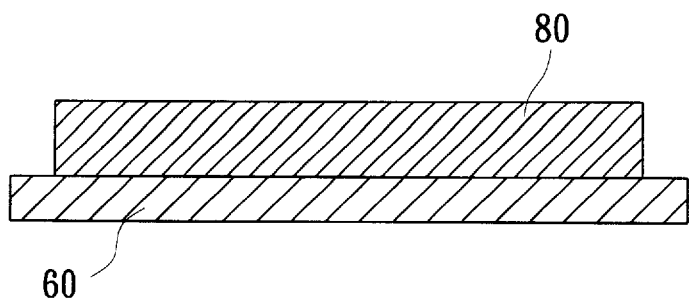

With reference to FIG. 2B, in the step of optical waveguide molding and sintering, the module of the silicon wafer 60 with the first photoresist layer 70 is disposed and fixed on a level plane that is supported by a spin support (not shown) such as a spin chuck. The support then performs high speed rotation with the silicon wafer 60 fixed on the plane by vacuum suction or other methods. The prepared solution mentioned above is dropped onto the spinning silicon wafer 60 using the burette and undergoes spinning at 500 to 2600 rpm. The temperature is then increased from the room temperature 25° C. to the molding temperature 800° C. After molding, the silicon wafer 60 is naturally cooled to room temperature and put into a beaker with acetone. The beaker is vibrated by an ultrasonic vibrator for about 20 minutes. The silicon wafer 60 is then washed by deionized water and dried by a nitrogen gun to remove the first photoresist layer, forming a layer of structured optical waveguide buffer 80. This step, referring to FIG. 2C, involves such processes as condensation, removing optical waveguide photoresist layer and sintering that are done at once.

Figure 2D:
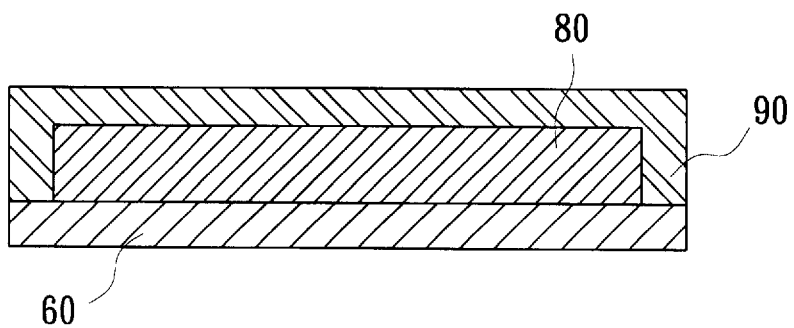
Figure 2E:
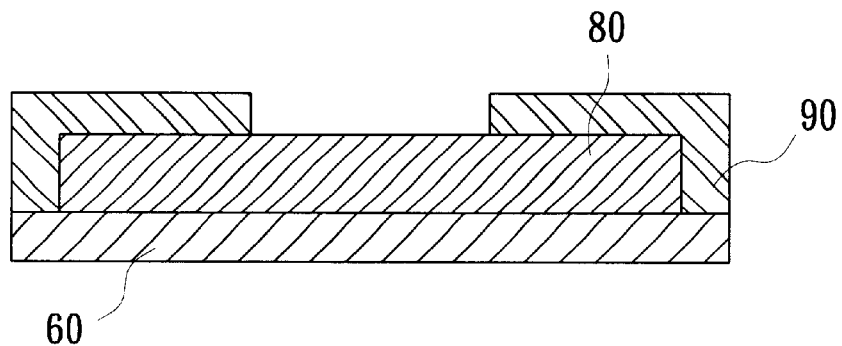
Figure 2F:
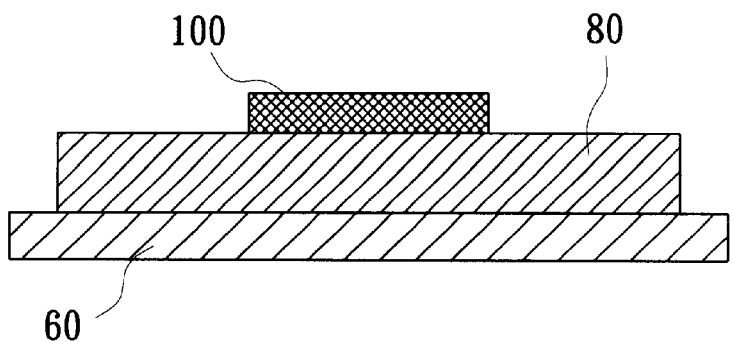

A core layer 100 is made by following similar steps. A second photoresist layer 90 is deposited on the silicon wafer 60 and the buffer layer 80. As shown in FIGS. 2D and 2E, the domain of photoresist waveguide core layer is defined. A proper amount of the prepared solution is dropped and fills within the defined photoresist waveguide core layer 100 using the burette. Through the same sintering process and removing the second photoresist layer 90, a layer of structured optical waveguide core layer 100 is formed. This step also includes condensation, removing optical waveguide photoresist layer and sintering done at once, as shown in FIG. 2F.

Figure 2G:
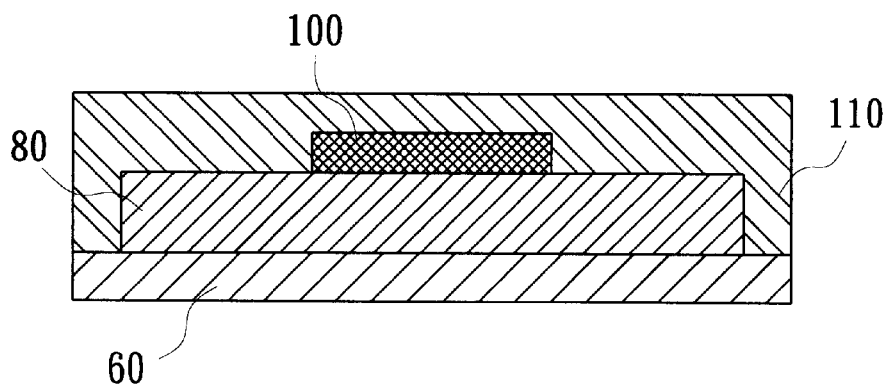
Figure 2H:
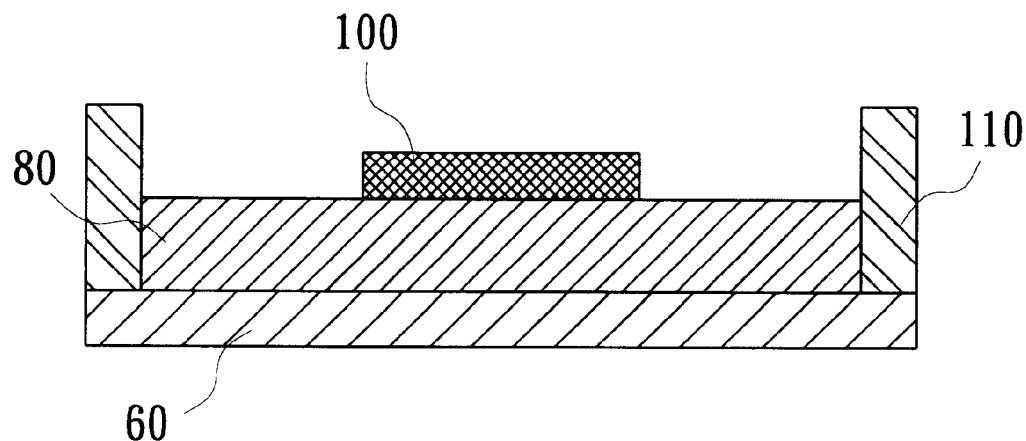
Figure 2I:
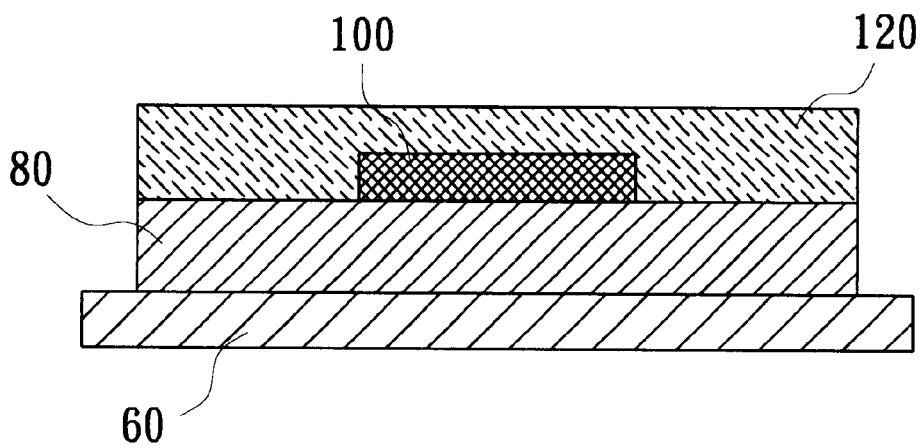
Figure 3:
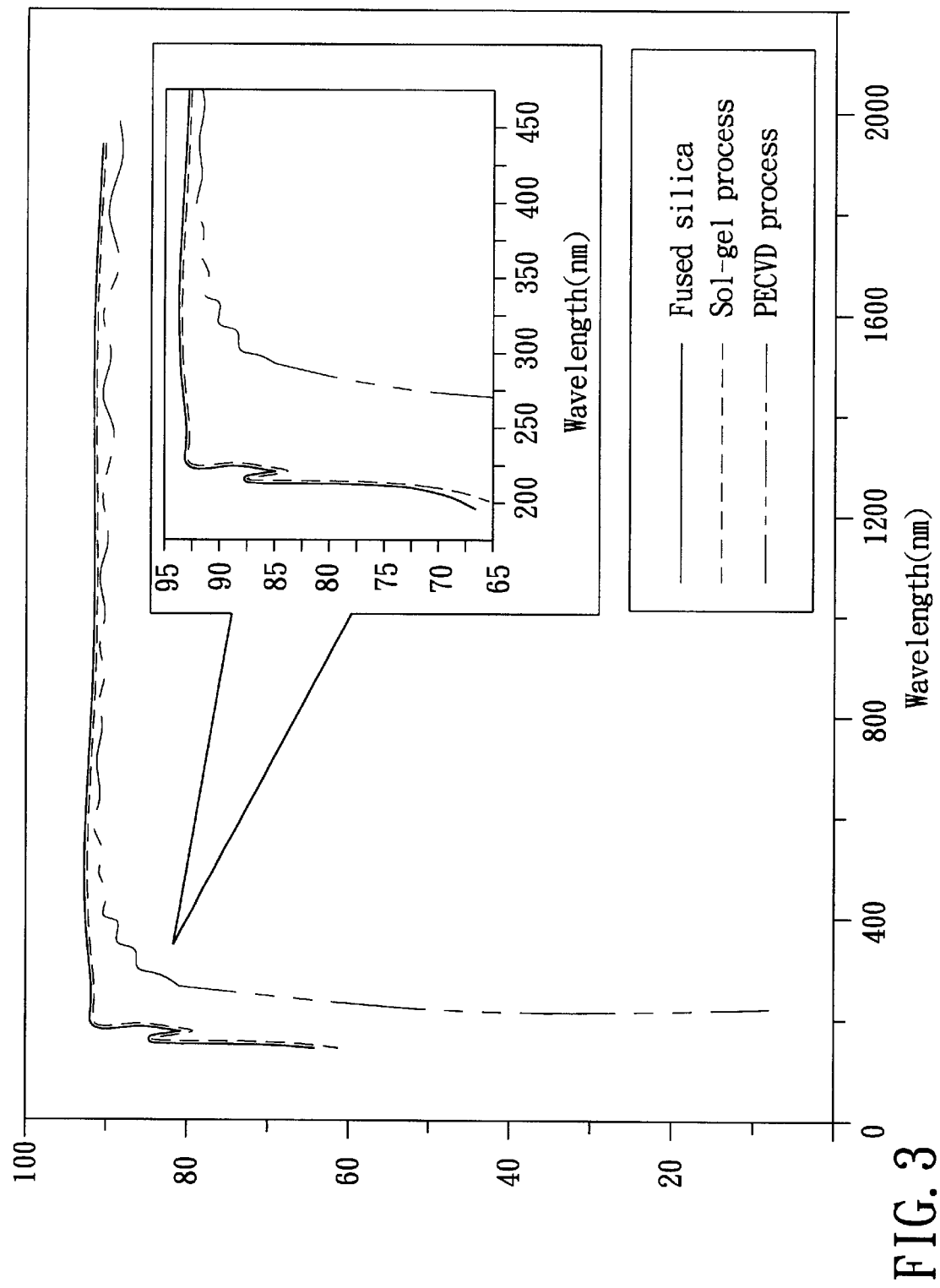
FIG. 3 is a schematic comparison diagram of the UV spectra of the invention and the prior art.

A cladding layer 120 is manufactured by following the same procedure. A third photoresist layer 110 is coated over the silicon wafer 60, the buffer layer 80, and the core layer 100 and the domain of the photoresist waveguide cladding layer is defined. Referring to FIGS. 2G and 2H, a proper amount of the prepared solution is dropped and fills within the defined photoresist waveguide cladding layer 120 using the burette. Through the same sintering process and removing the third photoresist layer 110, a layer of structured optical waveguide cladding layer 120 is formed. This step also includes condensation, removing optical waveguide photoresist layer and sintering done at once. The completed sol-gel optical waveguide is shown in FIG. 2I The advantages of the present invention over the prior art are:
1. The manufacturing process for preparing sol-gel optical waveguides proposed by the invention involves few steps, simple procedures, and requires a lower cost than the conventional FHD, ion exchange, and CVD methods.
2. Manufacturing layers with thickness that can not be achieved by the ion exchange and the new low cost photosensitive sol-gel methods becomes possible using the invention.
3. The ingredients required by the invention are simpler than the photosensitive sol-gel method and do not need photosensitive materials.
4. The UV spectrum of the silicon dioxide made by the invention is shown in FIG. 3 It is noted that the UV absorption stop frequency of the material prepared in the present invention is closer to pure fused silica than silica manufactured using PECVD. This feature further demonstrates the practicality and superiority of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A manufacturing process for preparing sol-gel optical waveguides, comprising the steps of:
   preparing the sol-gel solution, which comprises the substeps of:
      mixing 1 to 10 mols of water and 5 to 50 mols of alcohol to form an alcoholic solution and adjusting the solution to have a pH value smaller than 5, adding to the alcoholic solution 1 to 5 mols of tetraethylorthosilicate (TEOS) and churning thoroughly;
   coating a first photoresist layer over a silicon wafer and defining a waveguide domain;
   filling and sintering the sol-gel solution within the defined waveguide domain;
   removing the first photoresist layer and forming a buffer layer over the silicon wafer;
   coating a second photoresist layer over the silicon wafer and the buffer layer and defining a waveguide core layer domain;
   filling and sintering the sol-gel solution within the defined waveguide core layer domain;
   removing the second photoresist layer and forming the core layer over the buffer layer;
   coating a third photoresist layer over the silicon wafer, the buffer layer and the core layer, and defining a waveguide cladding layer domain;
   filling and sintering the sol-gel solution within the defined waveguide cladding layer domain; and
   removing the third photoresist layer and forming the cladding layer over the buffer layer and the core layer.

2. The manufacturing process according to claim 1, wherein the prepared sol-gel solution needs to be stored for at least 18 hours before use.

3. The manufacturing process according to claim 1, wherein the first photoresist layer, the second photoresist layer, and the third photoresist layer are processed by the steps of soft baking, exposure, development, deionized water washing, nitrogen gun drying, and hard baking.

4. The manufacturing process according to claim 1, wherein the buffer layer, the core layer, and the cladding layer are processed by spinning.

5. The manufacturing process according to claim 1, wherein the sintering step further comprises a condensation step.

6. The manufacturing process according to claim 1, wherein the removal of the first photoresist layer, the second photoresist layer, and the third photoresist layer is achieved by the steps of ultrasonic vibration with acetone, deionized water washing, and nitrogen gun drying.

* * * * *